United States Patent [19]

Simmerman et al.

[11] Patent Number: 5,076,446

[45] Date of Patent: Dec. 31, 1991

[54] HANGER CADDY TRANSPORTER WITH RESTRAINING DEVICES

[75] Inventors: Richard H. Simmerman, Palatine; Gregg E. Wiederer, Arlington Heights, both of Ill.

[73] Assignee: Hanger-Tight Company, Wheeling, Ill.

[21] Appl. No.: 365,905

[22] Filed: Jun. 14, 1989

[51] Int. Cl.$^5$ ................................................ A47F 5/00
[52] U.S. Cl. ...................................... 211/113; 104/89; 211/123
[58] Field of Search .................. 211/113, 94, 164, 123, 211/124, 118, 7, 105.1, 4, 8; 104/89

[56] References Cited

U.S. PATENT DOCUMENTS

| | | |
|---|---|---|
| 864,114 | 8/1907 | Wheary ................................ 211/113 |
| 1,738,030 | 12/1929 | Bebb ................................ 211/118 X |
| 2,440,513 | 4/1948 | Kailin et al. ...................... 211/118 X |
| 2,922,567 | 1/1960 | McDermott ...................... 211/118 X |
| 3,283,914 | 11/1966 | Robinson . |
| 3,505,961 | 4/1970 | McElroy . |
| 3,561,365 | 2/1971 | Rooklyn . |
| 3,572,251 | 4/1971 | Johnson . |
| 3,613,898 | 10/1971 | Brennan . |
| 3,827,366 | 8/1974 | Pamer . |
| 3,868,906 | 3/1975 | Cameron . |
| 3,921,814 | 11/1975 | Solomon . |
| 4,037,728 | 7/1977 | Cameron . |
| 4,079,840 | 3/1978 | Usner . |
| 4,324,352 | 4/1982 | Goldfarb et al. . |
| 4,340,145 | 7/1982 | Cameron . |
| 4,704,969 | 11/1987 | Schonenberger ............... 211/118 X |
| 4,753,355 | 6/1988 | Hall et al. . |
| 4,754,884 | 7/1988 | Schonenberger et al. ......... 211/113 |
| 4,887,727 | 12/1989 | Simmerman . |

Primary Examiner—David L. Talbott
Attorney, Agent, or Firm—Willian Brinks Olds Hofer Gilson & Lione

[57] ABSTRACT

A hanger caddy transporter includes a rectangular frame and two hooks for coupling the transporter to a trolley. A pair of slidable blocking members move between an upper position to retain the hooks on the trolley and a lower position to release the hooks from the trolley. The hooks are adjustably mounted on the transporter to allow the separation between the hooks to be adjusted as desired.

30 Claims, 3 Drawing Sheets

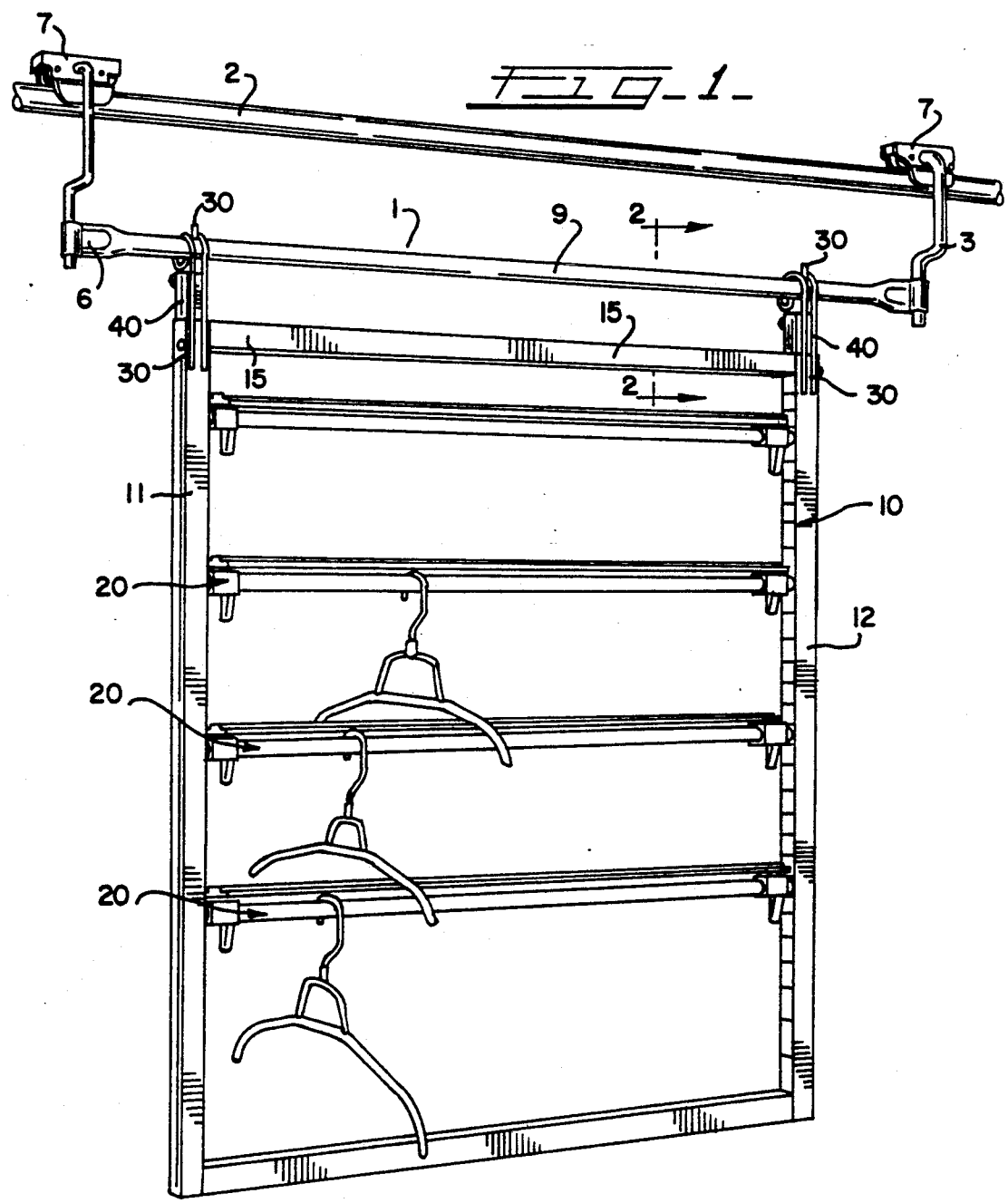

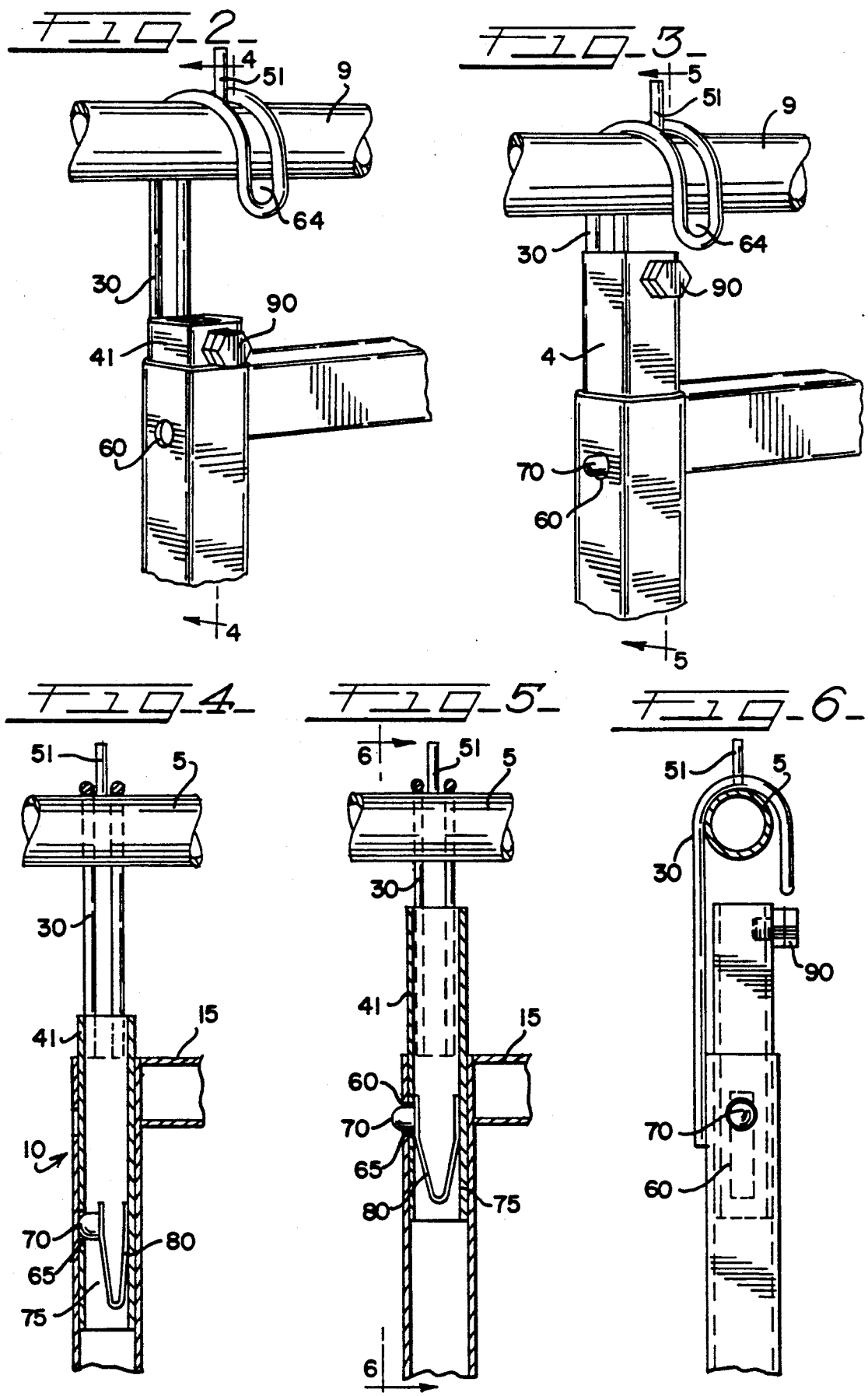

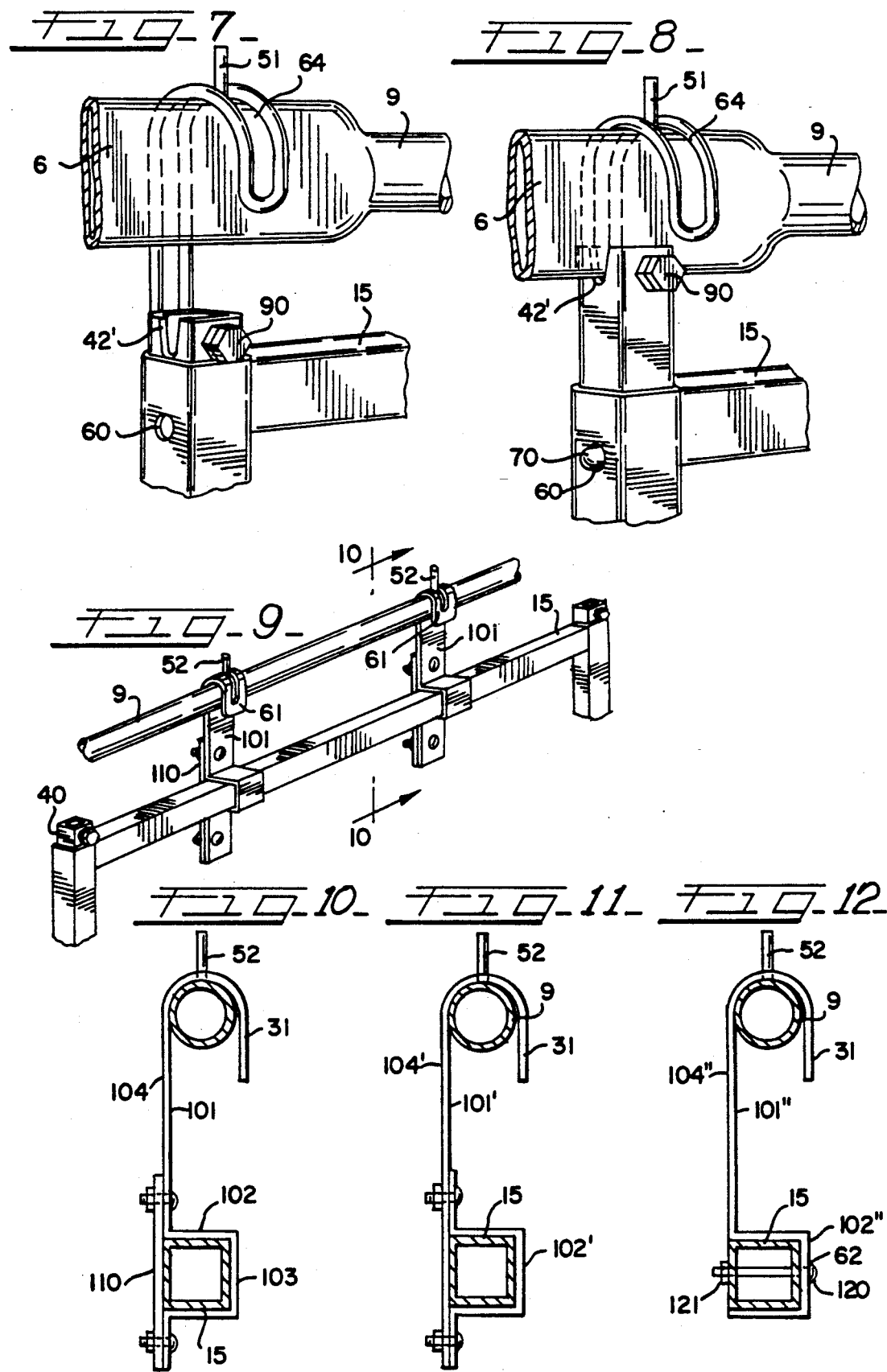

HANGER CADDY TRANSPORTER WITH RESTRAINING DEVICES

BACKGROUND OF THE INVENTION

The present invention relates to an improved transportation assembly for hanger caddies which comprises devices for retaining the hanger caddy transporter on a trolley.

Hanger caddies have been used for some time to organize and retain garment hangers so as to provide a means for transporting garment hangers. Cameron U.S. Pat. No. 3,868,906, Cameron U.S. Pat. No. 4,340,145 and U.S. Pat. Application Ser. No. 07/245,764 (each assigned to the assignee of the present invention) all disclose hanger caddies capable of being utilized in this invention.

Such hanger caddies are typically transported on transporters which are themselves moved on trolleys. For example, a conventional trolley comprises a trolley rail, a pair of roller assemblies mounted on the trolley rail and a pair of trolley arms each descending from a respective roller assembly and attached to one end of a trolley bar upon which objects can be mounted. The trolley bar can be moved on the trolley rail manually it can be moved automatically. Robinson U.S. Pat. No. 3,283,914, Solomon U.S. Pat. No. 3,921,814 and Cameron U.S. Pat. No. 4,079,840 all disclose means to secure garment hangers as they are being moved on a trolley system.

In the past, hanger caddy transporters have been known to swing, shift axially, and even slip off the trolley bar upon which they are mounted. A need presently exists for an improved transporter that reduces the tendency of the transporter to drop off of the trolley, shift, or swing.

SUMMARY OF THE INVENTION

According to a first feature of this invention, a hanger caddy transporter is mounted onto a trolley by a pair of hooks. After mounting, a pair of blocking members, each attached to a top portion of the hanger caddy transporter, are set in a closed position so as to lock the hanger caddy transporter to the trolley. After being moved on the trolley, the hanger transporter can be conveniently detached by moving the blocking member to an open position, thereby unlocking the hanger caddy transporter from the trolley and allowing the hooks to be removed from the trolley. Additionally, means can be provided to minimize axial shifting of the hanger caddy transporter with respect to the trolley.

According to a second feature of this invention, the blocking member is designed to prevent swinging of the transporter. The top surface of the blocking member can be made with a slot which engages flattened portions of the trolley bar.

According to a third feature of this invention, means are provided for preventing the hanger caddy transporter from sliding axially along the trolley bar as the transporter is being shipped on the trolley. Preferably, two straps having hooks with apertures are fitted over fixed pins on the trolley bar so as to provide a means to secure the hanger caddy transporter to the trolley and to prevent axial sliding along the trolley bar. The pair of straps can be adjusted axially along the hanger caddy transporter to allow the hooks to be adjusted in position so as to fit over various arrangements of fixed pins on the trolley bar.

The present invention, together with further objects and advantages, will best be understood with reference to the following detailed description read in conjunction with the accompanying drawings.

BRIEF DESCRIPTION OF THE DRAWINGS

FIG. 1 is a perspective view of a transportation assembly for hanger caddies that incorporates a first preferred embodiment of the present invention.

FIG. 2 is an enlarged perspective view of a portion of the of FIG. 1 showing a telescoping member in a open position.

FIG. 3 is enlarged perspective view corresponding to FIG. 2 showing the telescoping member in a closed position.

FIG. 4 is a cross sectional view taken along line 4—4 of FIG. 2.

FIG. 5 is a cross sectional view taken along line 5—5 of FIG. 3.

FIG. 6 is a sectional view taken along line 6—6 of FIG. 5.

FIG. 7 is an enlarged perspective view corresponding to FIG. 2 of a portion of a second preferred embodiment of the transportation assembly of this invention.

FIG. 8 is an enlarged perspective view of the structure of FIG. 7 in a closed position.

FIG. 9 is a perspective view of portions of a third preferred embodiment of the invention.

FIG. 10 is a cross sectional view taken along line 10—10 of FIG. 9.

FIG. 11 is a cross sectional view corresponding to FIG. 10 of an alternate configuration for the strap of FIG. 10.

FIG. 12 is a cross sectional view corresponding to FIG. 10 of another alternate configuration for the strap of FIG. 10.

DETAILED DESCRIPTION OF THE PREFERRED EMBODIMENTS

Referring to the drawings, FIGS. 1-6 relate to a first preferred embodiment of this invention, which includes a transporter 10 for hanger caddies.

The hanger caddy transporter 10 is mounted on a trolley bar 9 of a conventional trolley 1 by a pair of hooks 30, each located at a respective upper corner of the transporter 10. The trolley bar 9 is connected to roller assemblies 7 by trolley arms 3, and the roller assemblies are supported on a rail 2. Once mounted on the trolley 10, the transporter 10 can be moved along the trolley rail 2 via any conventional means.

The hanger caddy transporter 10 is composed of a first upright bar 11 connected to a second upright bar 12 by upper and lower horizontal bars 15. The hanger caddy transporter 10 secures a plurality of hanger caddies 20 in place. A preferred hanger caddy 20 is disclosed in U.S. Pat. Application Ser. No. 07/245,764 which is hereby incorporated by reference, although any conventional hanger caddy can be inserted into the hanger caddy transporter 10.

Each hanger caddy 20 can be inserted into and removed from spring clips (not shown in the drawings) located on each upright bar 11 and 12 of the hanger caddy transporter 10. Each hanger caddy 20 snaps in and out of the respective spring clips permitting easy insertion and removal of the hanger caddies 20 from the transporter 10. Hanger caddies 20 are set beneath the horizontal bar 15 and are placed one beneath the other. They are preferably spaced 6¾ inches from one another in this embodiment.

The hanger caddy transporter 20 can be made of a wide variety of materials. Preferably, the horizontal bar 15 and both upright bars 11 and 12 are square tubes one inch on a side and made of chrome plated 16 or 18 gauge steel.

In the first preferred embodiment of this invention, each of the upright bars 11, 12 supports at its upper end a respective hook 30 and a retaining means. The hooks 30 are fixed in place on the upright bars 11, 12, and the retaining means comprise blocking members that are shaped to slide in the upright bars 11, 12.

As best shown in FIGS. 4, 5 and 6, the blocking member is a telescoping member 41 which is locked in position in the hanger caddy transporter 10 by locking means 75. The locking means 75 includes a spring 80 set inside the telescoping member 41. The spring 80 is attached to a button 70 set in an aperture 65 of the telescoping member 41. When the user elevates the telescoping member 42 as shown in FIG. 5, the spring 80 biases the button 70 through an opening 60 of the respective upright bar 11, 12, thereby locking the telescoping member 41 in place. By applying pressure to the button 70 a user can compress the spring 80 inwardly and then push downwardly to lower the telescoping member 41 to the open position of FIG. 2.

Each telescoping member 41 is inserted into the top end of a respective upright bar 11, 12 of the transporter 10. Once inserted inside the upright bars 11 and 12, the telescoping members 41 can be elevated to a closed position shown in FIG. 3 so as to lock the transporter 10 to the trolley bar 9. The telescoping scoping member 41 is lifted to a position just beneath the trolley bar 9 to retain the hook 30 on the trolley bar 9 despite rocking and swinging of the transporter 10 as it is moved by the trolley 1.

Once the hanger caddy transporter 10 has been moved to its destination on the trolley 1, the telescoping member 41 can be lowered as shown in FIG. 2 so as to allow enough space between the trolley bar 9 and the telescoping member 41 to disengage the hook 30. Once the hook 30 is disengaged, the hanger caddy transporter 10 can then be removed from the trolley 1.

The telescoping member 41 can also be provided with a stop 90. The stop 90 provides a convenient means for the user to push against the telescoping member 41 in order to either lift or lower the telescoping member 41. The stop 90, which is located near the top of telescoping member 41, also precludes the telescoping member 41 from slipping completely into the upright bar 11, 12.

In addition to rocking and swinging, the caddy transporter 10 has a tendency to shift axially as it is being moved around the curves of trolley rail 2 or when it comes to a sudden stop. To control this problem, a pair of pins 51 are placed on top of the trolley bar 9, and the hooks 30 are designed with openings 64 to fit over the pins 51. Once the hook 30 is placed over the pin 51, the hanger caddy transporter 10 is positively prevented from moving axially along the trolley bar 9.

Though presently preferred, it is not essential in all embodiments that the blocking member telescope with respect to the transporter. For example, the blocking member can be a pivoting member secured to a respective end of the transporter and swung between an open and closed position. Similarly, it can be a sliding member mounted to slide on an external surface of the transporter between open and closed positions.

FIGS. 7-8 relate to a second preferred embodiment, which is designed to prevent swinging of the transporter 10. If the trolley bar 9 has flattened ends 6 as shown in FIG. 1, the top surface of the telescoping member 41' can be made with a slot 42'. When the blocking member 41' is raised as shown in FIG. 8, the slot 42' mates with the flattened end 6 of the trolley bar 9. The fit between the flattened end 6 of the trolley bar 9 and slot 42' of the telescoping member 41' reduces any tendency of the transporter 10 to swing as it is being moved along trolley 1. In addition to the slot, the second embodiment incorporates the features shown in FIGS. 1-6 and can applied to alternative blocking members such as the pivoting blocking member.

A third embodiment of this invention is shown in FIGS. 9 through 12. This embodiment uses a transporter 10 and retaining means 40 identical to those of the first embodiment. However, in this embodiment the transporter 10 is mounted to the trolley bar 9 by straps 101 which can be axially adjusted along the upper horizontal bar 15 of the hanger caddy transporter 10.

The strap 101 as best seen in FIG. 10 can be formed in two sections, a lower section 103 and an upper section 104. The upper section 104 comprises a hook 31 with an opening 61. The opening 61 of hook 31 is fitted over the fixed pins 52 of the trolley bar 9 in order to mount the hanger caddy transporter 10 onto the trolley bar 9 and to prevent axial shifting.

The lower section 103 of strap 101 provides a means 102 to clasp the horizontal bar 15. The strap 101 can be offset from the retaining means 40 and axially adjusted so as to be positioned to fit over fixed pins 52. Once set over the fixed pins 52, the strap 101 can be fastened to the horizontal bar by a backplate 110.

FIG. 11 shows an alternative configuration for a strap 101', the lower section 103' of which can be designed without means to clasp the horizontal bar 15. In this case the backplate 110' is provided with a means 102' to clasp the horizontal bar 15. The strap 101' can be axially adjusted along horizontal bar 15 to fit over fixed pins 52 to axially secure the transporter 10 to the trolley 1.

FIG. 12 shows another alternate configuration, for a strap 101'', the lower section 103 of which is provided with a means 102'' to clasp the horizontal bar 15. The strap 101'' is adjusted to mount and laterally secure the hanger caddy transporter 10 and then the strap is fastened to the horizontal bar 15 by a nut 121 and a bolt 120 placed through aperture 62 of strap 101'' and then through bores 63 and 66 of the horizontal bar 15.

An additional advantage of this embodiment is that the mounting means can be axially shifted along the upper horizontal bar 15 of the transporter 10 as necessary to adjust the transporter 10 to the pin placement of a particular trolley. Though preferred, it is not necessary to use the blocking members of the first and second embodiments in combination with the adjustable straps of FIGS. 9-12.

It should be apparent that a wide range of changes and modifications can be made to the preferred embodiments described above. It is therefore intended that the foregoing detailed description be regarded as illustrative rather than limiting, and that it be understood that it is the following claims, including all equivalents, which are intended to define this invention.

I claim:

1. A transportation assembly for hanger caddies to be placed on a trolley comprising:
   a. a hanger caddy transporter comprising a frame having a pair of spaced upright bars and at least one horizontal bar extending therebetween;
   b. means for mounting a plurality of garment hanger caddies to the transporter;
   c. means for mounting the transporter to a trolley such that the transporter may be readily place don and removed from the trolley; and
   d. means, separate from the mounting means, for retaining the hanger caddy transporter on the trolley and blocking accidental removal of the transporter from the trolley.

2. The transportation assembly of claim 1 wherein the trolley includes a trolley rail, first and second roller assemblies placed on the trolley rail, a trolley bar and first and second trolley arms connecting the first and second roller assemblies to the trolley bar; wherein the means for mounting the hanger caddy transporter to the trolley comprise a pair of hooks, each attached to the hanger caddy transporter; and wherein both hooks are positioned to engage the trolley bar.

3. The transportation assembly of claim 1 wherein the means for retaining the hanger caddy transporter on the trolley comprises a pair of blocking members, each secured to a respective end of the hanger caddy transporter, wherein the blocking members are movable between open and closed positions to lock and unlock the hanger caddy transporter on the trolley.

4. The invention of claim 3 wherein the hanger caddy transporter comprises:
   a plurality of garment hanger caddies placed beneath the horizontal bar, each caddy removably secured to the spaced upright bars.

5. The transportation assembly of claim 3 wherein each of the blocking members defines a top surface, and wherein the top surfaces are flat.

6. The transportation assembly of claim 1 wherein the hanger caddy transporter comprises:
   a plurality of garment hanger caddies placed beneath the horizontal bar, each caddy removably secured between the upright bars.

7. The transportation assembly of claim 6 wherein the means for retaining the hanger caddy transporter on the trolley comprises at least one blocking member secured to the horizontal bar, wherein the blocking member is movable between open and closed positions to lock and unlock the hanger caddy transporter on the trolley.

8. The transportation assembly of claim 7 wherein the blocking member is secured to the horizontal bar at a central location on the bar.

9. The transportation assembly of claim 1 wherein the means for retaining the hanger caddy transporter on the trolley comprises at least one blocking member secured to the transporter, wherein the blocking member is movable between open and closed positions to lock and unlock the hanger caddy transporter on the trolley.

10. A transportation assembly for hanger caddies to be placed on a trolley comprising:
    a. a hanger caddy transporter;
    b. means for mounting a plurality of hanger caddies to the transporter;
    c. means for mounting the transporter to a trolley; and
    d. means for retaining the hanger caddy transporter on the trolley;
    wherein the means for retaining the hanger caddy transporter on the trolley comprises a pair of blocking members, each secured to a respective end of the hanger caddy transporter, wherein the blocking members are movable between open and closed positions to lock and unlock the hanger caddy transporter on the trolley;
    wherein the hanger caddy transporter comprises:
    first and second upright bars;
    a horizontal bar with a first end connected to an upper portion of the first upright bar and a second end connected to an upper portion of the second upright bar; and
    a plurality of hanger caddies placed beneath the horizontal bar, each caddy removably secured to the first and second upright bars;
    wherein each of the blocking members comprises a telescoping member inserted into an upper portion of a respective one of the first and second upright bars and movable to a closed position to retain the hanger caddy transporter on the trolley.

11. The transportation assembly of claim 10 wherein each telescoping member comprises means for locking the telescoping member in the closed position with respect to the hanger caddy transporter.

12. The transportation assembly wherein each of the first and second upright bars defines a respective opening located at an upper exterior portion of the respective upright bar.

13. The transportation assembly of claim 12, wherein each telescoping member defines an aperture, wherein the locking means comprises a spring located inside the telescoping member and a button attached to the spring and set in the aperture of the telescoping member, and wherein the button is biased by the spring through the opening of the upright bar so as to lock the telescoping member in the closed position with respect to the hanger caddy transporter to retain the hanger caddy transporter on the trolley bar.

14. The transportation assembly of claim 13 wherein the telescoping member defines an upper portion, and wherein the telescoping member includes a stop positioned on the upper portion of the telescoping member.

15. A transportation assembly for hanger caddies to be placed on a trolley comprising:
    a. a hanger caddy transporter;
    b. means for mounting a plurality of hanger caddies to the transporter;
    c. means for mounting the transporter to a trolley; and
    d. means for retaining the hanger caddy transporter on the trolley;
    wherein the trolley includes a trolley rail, first and second roller assemblies placed on the trolley rail, a trolley bar and first and second trolley arms connecting the first and second roller assemblies to the trolley bar; wherein the means for mounting the hanger caddy transporter to the trolley comprises a pair of hooks, each attached to the hanger caddy transporter; and wherein both hooks are positioned to engage the trolley bar;
    wherein the trolley bar includes first and second fixed pins extending upwardly from the trolley bar, and wherein each of said hooks is placed between the trolley arms and the fixed pins so as to limit axial shifting of the caddy transporter on the trolley.

16. A transportation assembly for hanger caddies to be placed on a trolley comprising:

a. a hanger caddy transporter;
b. means for mounting a plurality of hanger caddies to the transporter;
c. means for mounting the transporter to a trolley; and
d. means for retaining the hanger caddy transporter on the trolley;
wherein the trolley includes a trolley rail, first and second roller assemblies placed on the trolley rail, a trolley bar and first and second trolley arms connecting the first and second roller assemblies to the trolley bar; wherein the means for mounting the hanger caddy transporter to the trolley comprises a pair of hooks, each attached to the hanger caddy transporter; and wherein both hooks are positioned to engage the trolley bar;
wherein the trolley bar includes first and second fixed pins extending upwardly form the trolley bar, and wherein each of said hooks has an aperture shaped to receive the respective fixed pin to axially position the hanger caddy transporter on the trolley.

17. A transportation assembly for hanger caddies to be placed on a trolley comprising:
a. a hanger caddy transporter;
b. means for mounting a plurality of hanger caddies to the transporter;
c. means for mounting the transporter to a trolley; and
d. means for retaining the hanger caddy transporter on the trolley;
wherein the means for retaining the hanger caddy transporter on the trolley comprises a pair of blocking members, each secured to the hanger caddy transporter, wherein the blocking members are movable between open and closed positions to lock and unlock the hanger caddy transporter on the trolley;
wherein the trolley comprises a bar having flattened ends, and wherein each of the blocking members defines a respective slot shaped to engage the respective flattened end to brace the hanger caddy transporter against swaying motion.

18. A transportation assembly for hanger caddies to be placed on a trolley comprising:
a. a hanger caddy transporter comprising a rectangular frame having a pair of spaced upright bars and at least one horizontal bar extending therebetween;
b. means for mounting a plurality of garment hanger caddies to the transporter;
c. at least two hook means for mounting the transporter to a trolley;
d. means for adjustably positioning the hook means on the transporter such that the hook means are separated from one another by an adjustable distance.

19. The invention of claim 18 wherein the hanger caddy transporter comprises:
a plurality of garment hanger caddies placed beneath the horizontal bar, each garment hanger caddy removably secured between the upright bars.

20. The transportation assembly of claim 17 wherein the transporter is retained on the trolley by a pair of blocking members, each secured to a respective end of the hanger caddy transporter, wherein the blocking members are movable between open and closed positions to lock and unlock the hanger caddy transporter on the trolley.

21. The transportation assembly of claim 20 wherein each of the blocking members defines a top surface, and wherein the top surfaces are flat.

22. A transportation assembly for hanger caddies to be placed on a trolley comprising:
a. a hanger caddy transporter;
b. means for mounting a plurality of hanger caddies to the transporter;
c. at least two hook means for mounting the transporter to a trolley;
d. means for adjustably positioning the hook means on the transporter such that the hook means are separated from one another by an adjustable distance;
wherein the hanger caddy transporter comprises:
first and second upright bars;
an upper horizontal bar with a first end connected to an upper portion of the first upright bar and a second end connected to an upper portion of the second upright bar; and
a plurality of hanger caddies placed beneath the horizontal bar, each removably secured to the first and second upright bars;
wherein the trolley includes a trolley rail, first and second roller assemblies placed on the trolley rail, a trolley bar with a pair of pins extending upwardly from the trolley bar and first and second arms connecting the first and second roller assemblies to the trolley bar; and wherein the at least two hook means for mounting the transporter comprise:
a. first and second straps which can be axially adjusted along the upper horizontal bar of the transporter, said straps comprising upper and lower sections, wherein the upper section of each strap comprises a hook, wherein each of said hooks has an aperture shaped to fit over a respective one of the fixed pins to engage and axially position the hanger caddy transporter on the trolley, and wherein the lower section of each strap comprises means to clasp the horizontal bar of the transporter; and
b. first and second backplates, wherein the first backplate is fastened to the first strap and wherein the second backplate is fastened to the second strap to adjustably secure each strap to the horizontal bar of the transporter.

23. A transportation assembly for hanger caddies to be placed on a trolley comprising:
a. a hanger caddy transporter;
b. means for mounting a plurality of hanger caddies to the transporter;
c. at least two hook means for mounting the transporter to a trolley;
d. means for adjustably positioning the hook means on the transporter such that the hook means are separated from one another by an adjustable distance;
wherein the hanger caddy transporter comprises:
first and second upright bars;
an upper horizontal bar with a first end connected to an upper portion of the first upright bar and a second end connected to an upper portion of the second upright bar; and
a plurality of hanger caddies placed beneath the horizontal bar, each removably secured to the first and second upright bars;
wherein the trolley includes a trolley rail, first and second roller assemblies placed on the trolley rail, a trolley bar with a pair of pins extending upwardly from the trolley bar and first and second arms connecting the first and second roller assemblies to the trolley bar; and wherein the means for mounting the transporter comprises:

a. first and second straps which can be axially adjusted along the upper horizontal bar of the transporter, said straps each comprising a hook, wherein each of said hooks has an aperture shaped to fit over a fixed pin to engage and axially secure the hanger caddy transporter to the trolley; and b. first and second backplates, wherein each backplate comprises means to clasp the horizontal bar and wherein the first backplate is fastened to the first strap and second backplate is fastened to the second strap to secure each strap to the horizontal bar of the transporter.

24. A transportation assembly for hanger caddies to be placed on a trolley comprising:

a. a hanger caddy transporter;
b. means for mounting a plurality of hanger caddies to the transporter;
c. at least two hook means for mounting the transporter to a trolley;
d. means for adjustably positioning the hook means on the transporter such that the hook means are separated from one another by an adjustable distance;

wherein the hanger caddy transporter comprises:
first and second upright bars;
an upper horizontal bar with a first end connected to an upper portion of the first upright bar and a second end connected to an upper portion of the second upright bar; and
a plurality of hanger caddies placed beneath the horizontal bar, each removably secured to the first and second upright bars;

wherein the trolley includes a trolley rail, first and second roller assemblies placed on the trolley rail, a trolley bar with a pair of pins extending upwardly from the trolley bar and first and second arms connecting the first and second roller assemblies to the trolley bar; and wherein the means for mounting the transporter comprises a pair of straps comprising upper and lower sections, wherein the upper section of each strap comprises a hook, wherein each of said hooks has an aperture shaped to fit over a fixed pin to engage and axially secure the transporter to the trolley, and wherein the lower section of each strap comprises means to clasp the horizontal bar of the transporter, and wherein the lower section of each strap is bolted to the horizontal bar.

25. A transportation assembly for hanger caddies to be placed on a trolley comprising:

a. a hanger caddy transporter;
b. means for mounting a plurality of hanger caddies to the transporter;
c. at least two hook means for mounting the transporter to a trolley;
d. means for adjustably positioning the hook means on the transporter such that the hook means are separated from one another by an adjustable distance;

wherein the hanger caddy transporter comprises:
first and second upright bars;
an upper horizontal bar with a first end connected to an upper portion of the first upright bar and a second end connected to an upper portion of the second upright bar; and
a plurality of hanger caddies placed beneath the horizontal bar, each removably secured to the first and second upright bars;

wherein the transporter is retained on the trolley by a pair of blocking members, each secured to a respective end of the hanger caddy transporter, wherein the blocking members are movable between open and closed positions to lock and unlock the hanger caddy transporter on the trolley;

wherein each of the blocking members comprises a telescoping member inserted into an upper end portion of a respective one of the first and second upright bars and movable to a closed position to retain the hanger caddy transporter on the trolley.

26. The transportation assembly of claim 25 wherein each telescoping member comprises means for locking the telescoping member in the closed position with respect to the hanger caddy transporter.

27. The transportation assembly of claim 26 wherein each of the first and second upright bars defines a respective opening located at an upper exterior portion of the respective upright bar.

28. The transportation assembly of claim 27 wherein each telescoping member defines an aperture, wherein the locking means comprises a spring located inside the telescoping member and a button attached to the spring and set in the aperture of the telescoping member, wherein the button is biased by the spring through the opening of the upright bar so as to lock the telescoping member in the closed position with respect to the hanger caddy transporter to retain the hanger caddy transporter on the trolley bar.

29. The transportation assembly of claim 27 wherein the telescoping member defines an upper portion, and wherein the telescoping member includes a stop positioned on the upper portion of the telescoping member.

30. A transportation assembly for hanger caddies to be placed on a trolley comprising:

a. a hanger caddy transporter;
b. means for mounting a plurality of hanger caddies to the transporter;
c. at least two hook means for mounting the transporter to a trolley;
d. means for adjustably positioning gate hook means on the transporter such that the hook means are separated from one another by an adjustable distance;

wherein the hanger caddy transporter comprises:
first and second upright bars;
an upper horizontal bar with a first end connected to an upper portion of the first upright bar and a second end connected to an upper portion of the second upright bar; and
a plurality of hanger caddies placed beneath the horizontal bar, each removably secured to the first and second upright bars;

wherein the transporter is retained on the trolley by a pair of blocking members, each secured to a respective end of the hanger caddy transporter, wherein the blocking members are movable between open and closed positions to lock and unlock the hanger caddy transporter on the trolley;

wherein the trolley comprises a bar having flattened ends, and wherein each of the blocking members defines a respective slot shaped to engage the respective flattened end to brace the hanger caddy transporter against swaying motion.

* * * * *

UNITED STATES PATENT AND TRADEMARK OFFICE
CERTIFICATE OF CORRECTION

PATENT NO. : 5,076,446
DATED : December 31, 1991
INVENTOR(S) : Richard H. Simmerman et al.

It is certified that error appears in the above-identified patent and that said Letters Patent is hereby corrected as shown below:

On the title page, Item [56]: under the heading "U.S. PATENT DOCUMENTS", please delete "Kailin" and substitute therefor --Kaelin--.

In column 1, line 26, after "manually" please insert --or--.

In column 2, line 13, after "the" please insert --assembly--; line 15, before "enlarged" insert --an--.

In column 3, line 34, before "member" please delete --scoping--.

UNITED STATES PATENT AND TRADEMARK OFFICE
CERTIFICATE OF CORRECTION

PATENT NO.   : 5,076,446
DATED        : December 31, 1991
INVENTOR(S)  : Richard H. Simmerman et al.         Page 2 of 2

It is certified that error appears in the above-identified patent and that said Letters Patent is hereby corrected as shown below:

Column 5, line 9, please delete "place don" and substitute therefor --placed on--.

Column 6, line 26, before "wherein" please insert --of claim 10--.

Column 7, line 18, please delete "form" and substitute therefor --from--.

Column 10, line 45, please delete "gate" and substitute therefor --the--.

Signed and Sealed this

Twenty-first Day of September, 1993

Attest:

BRUCE LEHMAN

*Attesting Officer*          *Commissioner of Patents and Trademarks*